United States Patent
Benaloh et al.

(10) Patent No.: US 7,337,324 B2
(45) Date of Patent: Feb. 26, 2008

(54) SYSTEM AND METHOD FOR NON-INTERACTIVE HUMAN ANSWERABLE CHALLENGES

(75) Inventors: Josh Benaloh, Redmond, WA (US); Ismail Cem Paya, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 848 days.

(21) Appl. No.: 10/725,243

(22) Filed: Dec. 1, 2003

(65) Prior Publication Data

US 2005/0120201 A1    Jun. 2, 2005

(51) Int. Cl.
H04L 9/32 (2006.01)
(52) U.S. Cl. .................. 713/182; 713/168; 713/170; 713/176; 726/27
(58) Field of Classification Search .............. 713/182, 713/170; 726/27
See application file for complete search history.

(56) References Cited

U.S. PATENT DOCUMENTS

| | | | | |
|---|---|---|---|---|
| 6,038,666 | A * | 3/2000 | Hsu et al. .................... | 713/186 |
| 6,742,039 | B1 * | 5/2004 | Remer et al. ................ | 709/229 |
| 7,139,916 | B2 * | 11/2006 | Billingsley et al. ......... | 713/182 |
| 7,149,899 | B2 * | 12/2006 | Pinkas et al. ................ | 713/182 |
| 2003/0028773 | A1 * | 2/2003 | McGarvey et al. ......... | 713/176 |

OTHER PUBLICATIONS

Stallings, William; Cryptography and Network Security; 2nd Edition; Prentice-Hall, Inc., Jun. 4, 1998; Chapter 8.*

Ahn, L., M. Blum, N. J. Hopper, Telling humans and computers apart (Automatically) or How lazy cryptographers do AI, *Technical Report* CMU-CS-02-117, Feb. 2002.

Baird, H. S., and K. Popat, Human interactive proofs and document image analysis, *Proc. 5th IAPR Workshop on Document Analysis Systems*, Princeton, N.J., Aug. 19-21, 2002.

CAPTCHA website, http://www.captcha.net, 2000.

Chew, M., and H. S. Baird, BaffleText: A human interactive proof, *Proc. 10th IS&T/SPIE Document Recognition & Retrieval Conf.*, Santa Clara, CA, Jan. 22, 2003.

Coates, A., H. Baird, and R. Fateman, Pessimal print: A reverse Turning test, *Proc. IAPR 6th Int'l Conf. on Document Analysis and Recognition*, Seattle, WA, Sep. 10-13, 2001, pp. 1154-1158.

Kochanski, G., D. Lopresti and C. Shih, A Reverse Turing Test Using Speech, Proc 7th *ICSLP, International Conference on Spoken Language Processing*, Sep. 16-20, 2002, Denver Colorado, pp. 1357-1360.

* cited by examiner

*Primary Examiner*—Gilberto Barron, Jr.
*Assistant Examiner*—Jung Kim
(74) *Attorney, Agent, or Firm*—Lyon & Harr, LLP; Katrina A. Lyon

(57) ABSTRACT

A system and method for automatically determining if a computer user is a human or an automated script. Human interactive proofs (HIPs) are currently used to deter automated registration for web services by automated computer scripts. Unfortunately, HIPs entail multiple steps (request service, receive challenge, respond to challenge) that can be burdensome. The system and method of the invention in one embodiment provides a "black-box" to potential users consisting of a challenge generator and a secret key. The challenge is generated for the user and the response can be provided as part of the service request, eliminating the need for a separate challenge from a service provider and response to the challenge.

37 Claims, 9 Drawing Sheets

SYSTEM AND METHOD FOR NON-INTERACTIVE HUMAN ANSWERABLE CHALLENGES

BACKGROUND

1. Technical Field

This invention is directed toward a system and method for determining whether a computer user is a human or a computer program. More specifically, the invention is directed toward a system and method for devising a non-interactive human answerable challenge.

2. Background Art

Web services are increasingly becoming part of everyday life. For example, free email accounts are used to send and receive emails, online polls are used to gather people's opinions, and chat rooms allow online users to socialize with others. However, many of these web services designed for human use are being accessed by computer programs or automated computer scripts simulating human activity. There are various types of such automated scripts. On the Internet, the most popular of such programs, called spiders or crawlers, are used for searching. They access web sites, retrieve documents and follow all of the hyperlinks in them, and then generate catalogs that are accessed by search engines. Some automated scripts converse with humans or other computer programs. One type of automated script searches the Web to find the best price for a product, while others observe a user's patterns in navigating a web site and customize the site for that user.

While the aforementioned automated scripts have legitimate uses, some are being employed for malicious purposes. For example, many service providers provide free email accounts. Unfortunately malicious programmers have designed automated scripts to register thousands of free email accounts so that they can send junk emails. This junk email or spam is undesirable because it is an annoyance to email users, bogs down email traffic, and sometimes perpetuates computer viruses. Online polling is a convenient and cost-effective way to obtain people's opinions. However, when these on-line polls are abused by automated scripts that skew poll results, their credibility reduces to zero. As mentioned previously, people use online chat rooms to socialize with others. However, automated scripts have been designed to join chat rooms and direct people to advertising sites. Similar situations arise with search engine sites. Additionally, best price scripts are often used by one merchant to undercut another merchant's prices.

In the battle against spam, as well as for several other applications such as those discussed above, it can be desirable to require a user to prove that they are a human instead of an automated script. Human Interactive Proofs (HIPs) are one tool that is being employed to filter out automated scripts. In a typical HIP scenario, a user who requests a service from a service provider, such as for example a request for an email account, is sent a challenge (for example, an unusual rendering of text) that is easy for a human to recognize and respond to but difficult for an automated script to decipher. The user then answers the challenge and sends the answer to the service provider. If the user correctly answers the challenge, the service provider allows the user access to the service (e.g., provides them with an email account). A problem with HIPs, however, is that the number of actions required and the delay associated with each action (the user's request for service, waiting for the challenge from service provider, responding to the challenge and sending the response back to the service provider) can be burdensome and time-consuming. In addition, requiring a service provider to implement the HIP involves fixed development costs, as well as ongoing operational costs.

Therefore, what is needed is a system and method that can create a human proof that can consistently and correctly distinguish a human computer user in a more efficient manner.

SUMMARY

The invention is directed toward a system and method for determining if a computer user is a human or a computer program such as an automated script. The system and method of the invention does not require a user to interact with a service provider in order to obtain and answer a challenge. Thus, the embodiments of the system and method according to the invention are advantageous in that they preclude the need for the great number of actions and time delays that are required for typical HIP systems where a service provider sends a challenge to a user, the user answers the challenge and sends their answer back to the service provider, and the service provider verifies the user's answer before allowing the user access to the service. Additionally, the invention allows some of the HIP costs to be shifted to devices owned by the user or a dedicated third party instead of the service provider.

In general, in one embodiment of the invention, a computer user's computing device is equipped with a trusted computing environment or device consisting of a challenge generator and a secret key. The challenge is generated for the user by the user's trusted computing environment or device, and the user answers the challenge. A digital signature which may or may not include the user's answer, or may be appended to the user's answer, is provided as part of the user's service request to a service provider to access their services. For example, the digital signature can be appended to the message body (which may include such things as the correct answer, timestamp, request for services, and so on) to prove the authenticity and integrity of the message to the service provider. Such a signed assertion or signed message created by the trusted computing environment or device, or trusted third party in the case where one is employed, proves to the services provider that the user has completed the challenge. This obviates the need for a separate challenge to be generated and sent from the service provider and the user's response to that challenge being sent back to the service provider. It also significantly reduces the burden on the service provider.

More specifically, in one embodiment of the system and method according to the invention, a user wishing to request a particular service creates its own challenge using its trusted computing device or environment. The user then answers the challenge and the trusted computing environment evaluates the user's answer to the challenge. The trusted computing environment generates a digital signature (e.g., a signed assertion) attesting to the user's successful completion of the challenge which is attached to the user's request for services and sent to the service provider. Once the service provider receives the user's message, the digital signature can then be verified by the service provider. If the digital signature is acceptable, the service provider processes the user's request for services and provides the user access to their services. Access to these services could include, for example, assigning an email account, validating an input in a poll, allowing use of a search engine, allowing use of a chat room, and allowing access to data on a website.

In another embodiment similar to the one described above, the digital signature or signed assertion generated by the user's trusted computing environment includes the user's answer to the challenge, while not determining if the user's answer is correct or not. In this case, when the user's request for service message is sent to the service provider, the digital signature includes the user's answer, or the user's answer is appended to the digital signature, and the service provider makes the determination as to whether the user's answer to the challenge is correct or not. This determination is made by the service provider using the same secret key as was used by the user's trusted environment to generate the challenge. In this embodiment it is preferable if the message to the service provider (including the digital signature) is encrypted. Otherwise it would be possible for the user to read the answer to the challenge from the signature or signed assertion. It should be noted that in any one of the embodiments disclosed herein a keyed hash can be used as an alternative to a digital signature. A keyed hash (a hash in which one of the inputs is a secret key) requires the authenticator to share a secret key with the entity being authenticated, so a digital signature is sometimes preferred.

The foregoing embodiment of the invention can be exemplified in a version specific to electronic mail. In this version, the user's trusted computing environment computes a one-way cryptographic hash of the contents of a message using, for example, the date, the sender's name/address, the recipient's name/address, and the secret key. In general, a cryptographic hash is a mathematical function that maps values from a large (or even very large) domain into a smaller range, and is (a) one-way in that it is computationally infeasible to find any input which maps to any pre-specified output; and (b) collision-free in that it is computationally infeasible to find any two distinct inputs which map to the same output. In the present invention, the result of the aforementioned hash is used to generate a short sequence of alphanumeric characters which can, for example, then be rendered into a visual image that is given to the user as a challenge. The user can then identify the text string as their answer to the challenge and include it with the mail message. A recipient, such as the service provider, with access to the same secret key can check that the included text string matches the hash of the message contents, date, etc., and reject the message if there is no match. This relieves the sender from the burden of having to wait for a challenge from the recipient and relieves the recipient from having to send the challenges. Similar benefits can be obtained for other types of services besides email.

In yet another embodiment of the system and method according to the present invention, the user's trusted computing environment issues an arbitrary challenge to the user that requires the user to expend significant resources to answer. Upon successful completion of the challenge, the trusted computing environment or device digitally signs an assertion that the challenge has been successfully answered for a particular message. This embodiment of the invention operates on the theory that most automated scripts will not expend a great amount of computer resources in maliciously obtaining a service provider's services. In this embodiment the requirement for computation serves the same purpose as the challenge—raising the cost of the operation to deter abuse. The aforementioned signed assertion is attached to the user's message requesting the service provider's service in order to allow the recipient to verify that sufficient resources have been expended on this message.

A variant of the embodiment discussed in the paragraph above can be exemplified in an embodiment that employs the user's trusted computing environment to digitally sign an assertion for any message that it is given, but to report back to the user only a partial digital signature. The missing portion of the signature is then rendered as a challenge whose answer, when combined with the given portion of the signature, forms a complete signature. One advantage of this method is that it reduces the number of message round trips between the user and the trusted device from two (send message requesting services, receive challenge, answer challenge and receive signature) to one (send message requesting services and receive partial signature). In this variant, it is also possible for the user to perform a computational search for the missing portion of the signature—thus obviating the need for user interaction by expending computational resources rather than human effort on the message.

In yet other alternate embodiments of the system and method according to the invention discussed above, the user's trusted computing environment is replaced with a trusted third party. In these embodiments, the trusted third party performs the functions of the user's trusted computing environment.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
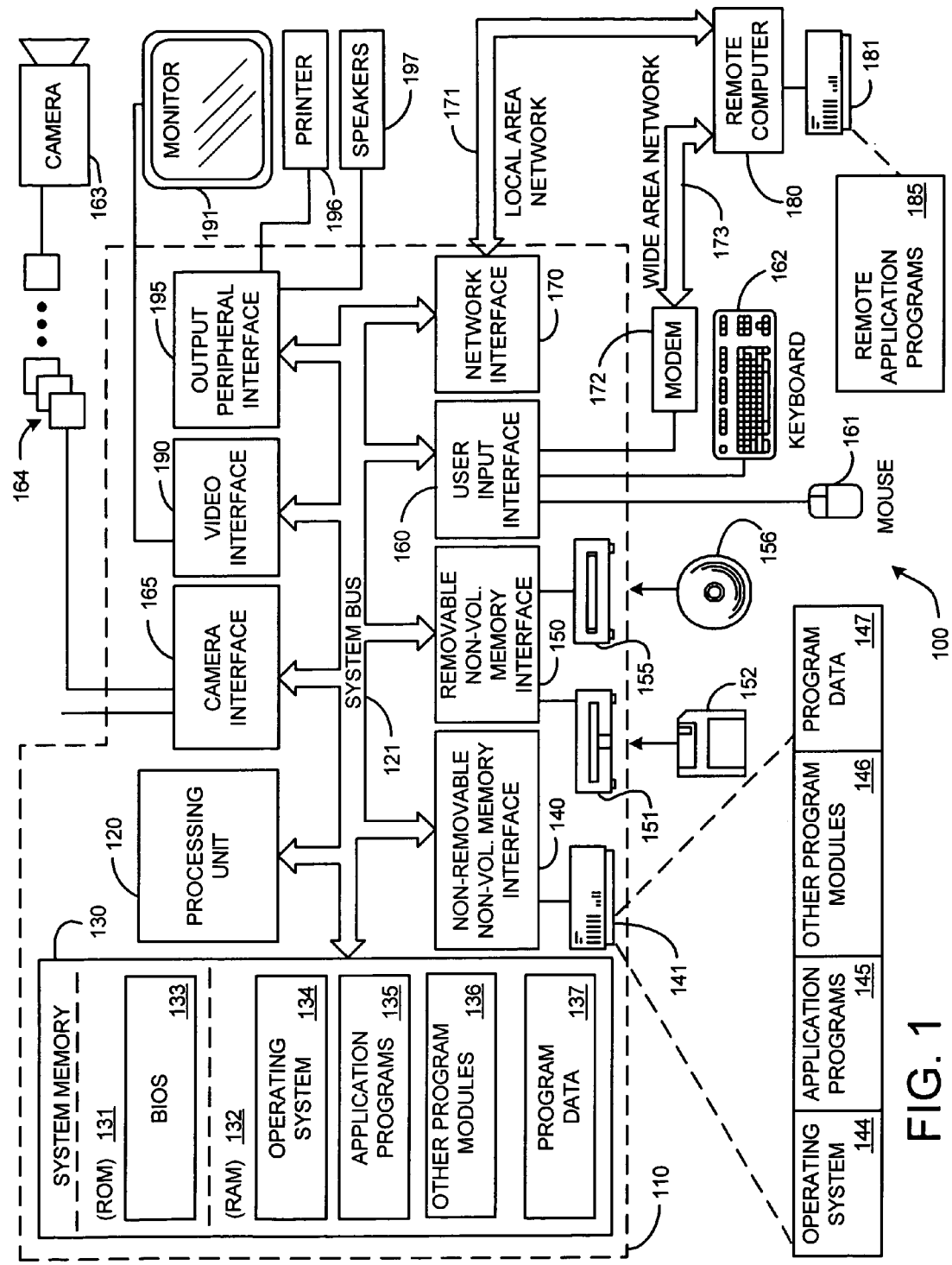
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that performs particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available physical media that can be accessed by computer 110 and includes both volatile and nonvolatile media, removable and non-removable media. By way of example, and not limitation, computer readable media may comprise physical computer storage media. Computer storage media includes both volatile and nonvolatile, removable and non-removable media implemented in any physical method or technology for storage of information such as computer readable instructions, data structures, program modules, or other data. Computer storage media includes physical devices such as, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 A System and Method for Non-interactive Human Answerable Challenges

The exemplary operating environment having now been discussed, the remaining parts of this description section will be devoted to a description of the program modules embodying the invention. The following sections provide an overview of the system and method according to the invention and various embodiments thereof.

2.1 System Overview

Figure 2:
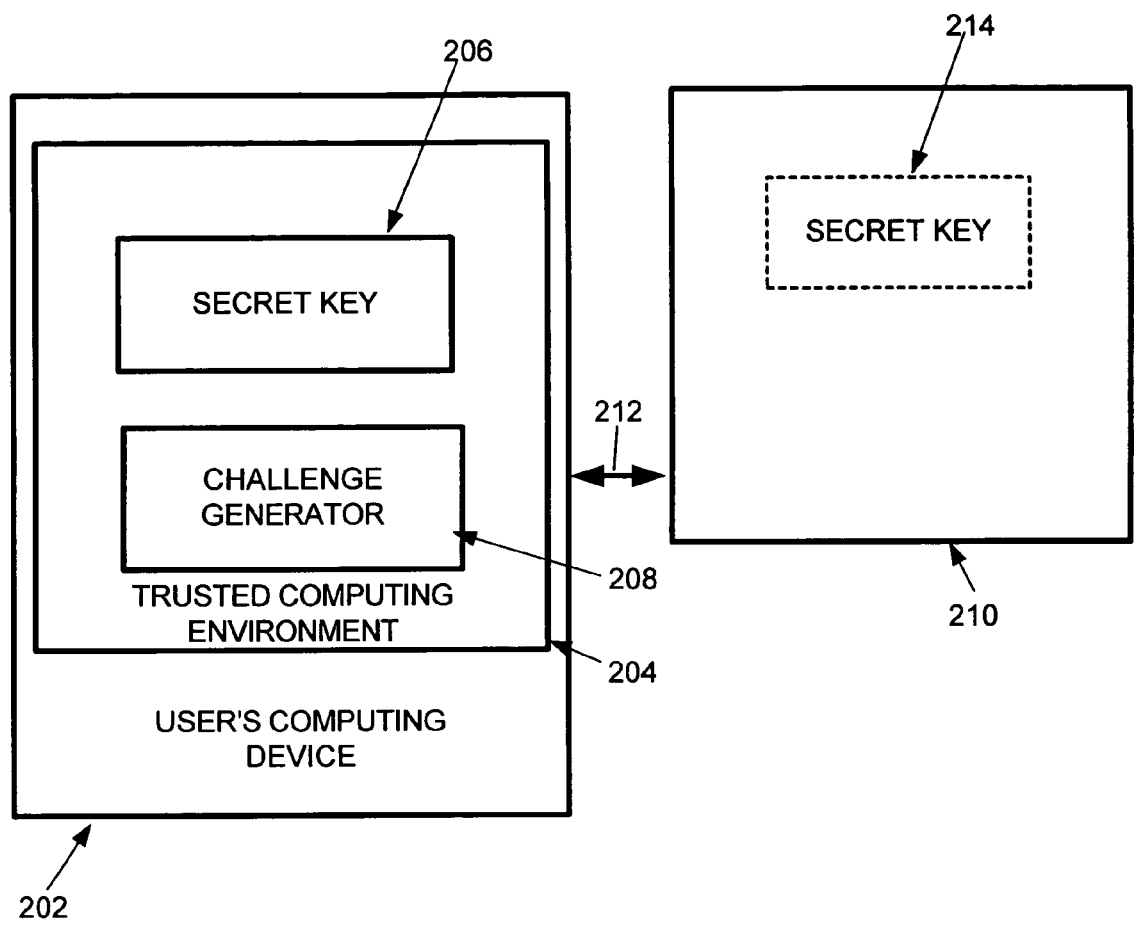
FIG. 2 is a simplified schematic of the system according to one embodiment of the invention.

One embodiment of the system according to the invention is shown in FIG. 2. As shown in FIG. 2, a user's computing device 202 includes a trusted computing environment or device 204 that includes a secret key 206 and challenge generator 208. The trusted computing environment/device 204, secret key 206 and challenge generator 208 are discussed in greater detail below. The user (e.g., the user's computing device 202) can send a request for service that may include various information such as, for example, message content, date, time, a sender's name/address, the recipient's name/address, an answer to a challenge generated by the challenge generator, and so on, as well as a digital signature attesting that the user's trusted environment or device generated and sent the request for service to the service provider 210. This message is typically sent over a network 212. The service provider 210 evaluates the user's request using the digital signature to verify the message content and the user's trusted computing environment's identity. In one embodiment, the service provider can also optionally verify the user's answer to the challenge using a secret key 214 that is the same as the user's. In this case a shared key would be used. However, either shared-key (symmetric) or public key (asymmetric) conventional encryption techniques could be used to encrypt the message containing the user's request and digital signature. With shared keys the trusted device (or a third party) share a different secret key with each service provider. This key is used to encrypt the answer and attestation which the service provider can decrypt with the same key. In the asymmetric approach the key has two pieces: a private key held by the service provider, and a public key available to the trusted environment/device (or trusted third party). Encryption in this case is performed with the public key, and decryption with the private key.

2.1.1 Trusted Computing Environment or Trusted Device

Various trusted computing environments and trusted devices can be used with the system and method according to the invention. Many trusted computing environments and devices of various forms are known. For this application, a trusted computing environment is a module capable of storing and computing with data not available to the computer user. For example, one known trusted computing environment is Microsoft® Corporation's Next Generation Secure Computing Base (NGSCB). NGSCB employs hardware and software to enable secure computing capabilities to provide enhanced data protection, privacy, and system integrity. NGSCB transforms a PC into a platform that can perform trusted operations spanning multiple computers under a trust policy that can be dynamically created and whose integrity anyone can authenticate. NGSCB includes strong process isolation where users can wall off and hide pages of main memory so that certain applications can be assured that they are not modified or observed by any other application or even the operating system. NGSCB also includes sealed storage. Information can be stored in such a way that only the application from which data is saved (or a trusted designated application or entity) can open it. NGSCB also includes a secure path to and from the user. Secure channels allow data to move safely from the keyboard/mouse to certain applications, and for data to move from these applications to a region of the screen. NGSCB also ensures that users have the ability to authenticate software or a combination of software and hardware. In this authentication, a piece of code can digitally sign or otherwise attest to a piece of data and thus assure the recipient that the data was constructed by an unforgeable, cryptographically identified trusted software stack.

A smart card is another trusted device that can be employed with the system and method according to the invention. A smart card is a card, often the size and shape of a credit card, that contains a computer chip and is used to store and/or process information. For example, a smart card can be used with the invention as follows. The user's computer provides information about the sender to the smart card device. The smart card then issues a challenge based on the information from the user. The user answers the challenge, providing it to the smart card, and the smart card sends the user's information and "signed statement" stating that the user/sender can be trusted if the receiving device, in this case the service provider, trusts the user's trusted computing environment or device. Other trusted devices may include a USB dongle or a USB memory plug.

2.1.2 Secret Key

The system and method according to the invention employs conventional cryptography techniques and includes encryption, decryption, and other similar techniques. Encryption is the transformation of data into a form that is difficult to read without the appropriate knowledge (e.g., a key). Its purpose is to ensure privacy by keeping information hidden from anyone for whom it is not intended, even those who have access to the encrypted data. Decryption is the transformation of encrypted data back into its original form.

Encryption and decryption generally require the use of some secret information, referred to as a key. For some encryption mechanisms, the same key is used for both encryption and decryption; for other mechanisms, the keys used for encryption and decryption are different. A digital signature binds a document to the possessor of a particular key, while a digital timestamp binds a document to its creation at a particular time.

There are two primary types of cryptosystems: secret-key and public-key cryptography. In secret-key cryptography, also referred to as symmetric cryptography, the same key is used for both encryption and decryption. The most popular secret-key cryptosystems in use today are the Data Encryption Standard (DES) and RC4.

In public-key cryptography, each user has a public key and a private key. The public key is made public while the private key remains secret. Encryption is performed with the public key while decryption is done with the private key. The RSA (Rivest, Shamir, and Adleman) public-key cryptosystem is the most popular form of public-key cryptography and can be used for both encryption and digital signatures. The Digital Signature Algorithm (DSA) is also a popular public-key technique, though it can only be used only for signatures, not encryption. Elliptic curve cryptosystems (ECCS) are cryptosystems based on mathematical objects known as elliptic curves. Elliptic curve cryptography has been gaining in popularity recently. Lastly, the Diffie-Hellman key agreement protocol is a popular public-key technique for establishing secret keys over an insecure channel.

It should be noted that in any one of the embodiments disclosed herein a key hash can be used as an alternative to a digital signature. A keyed hash (a hash in which one of the inputs is a secret key) requires the authenticator to share a secret key with the entity being authenticated, so a digital signature is sometimes preferred.

In one embodiment of the invention, a secret key 206 is used to generate the digital signature that the user's trusted computing environment attaches to the message (e.g., service request) which is sent from the user to the service provider. A digital signature is extra data appended to a message which identifies and authenticates the sender and message data. In one embodiment of the invention that uses public key encryption, the sender uses a one-way hash function to generate a hash-code from the message data. The hash-code length can vary. The sender then encrypts the hash-code with a secret key. The receiver (e.g., service provider) recomputes the hash-code from the data and verifies the received hash with the sender's public key. If the two hash-codes are equal, the receiver can be sure that data has not been corrupted and that it came from the given sender. Various conventional technologies can be used to protect the secret key material.

2.1.3 Challenge Generator

Various challenge generators are known in the area of Human Interactive Proofs. A challenge generator generates a challenge that is issued to the user to determine whether the user is a human, or a computer program such as an automated script. Challenges allow one party to gain assurances that the identity of another is as declared, thereby preventing impersonation of humans by machines.

Figure 3:
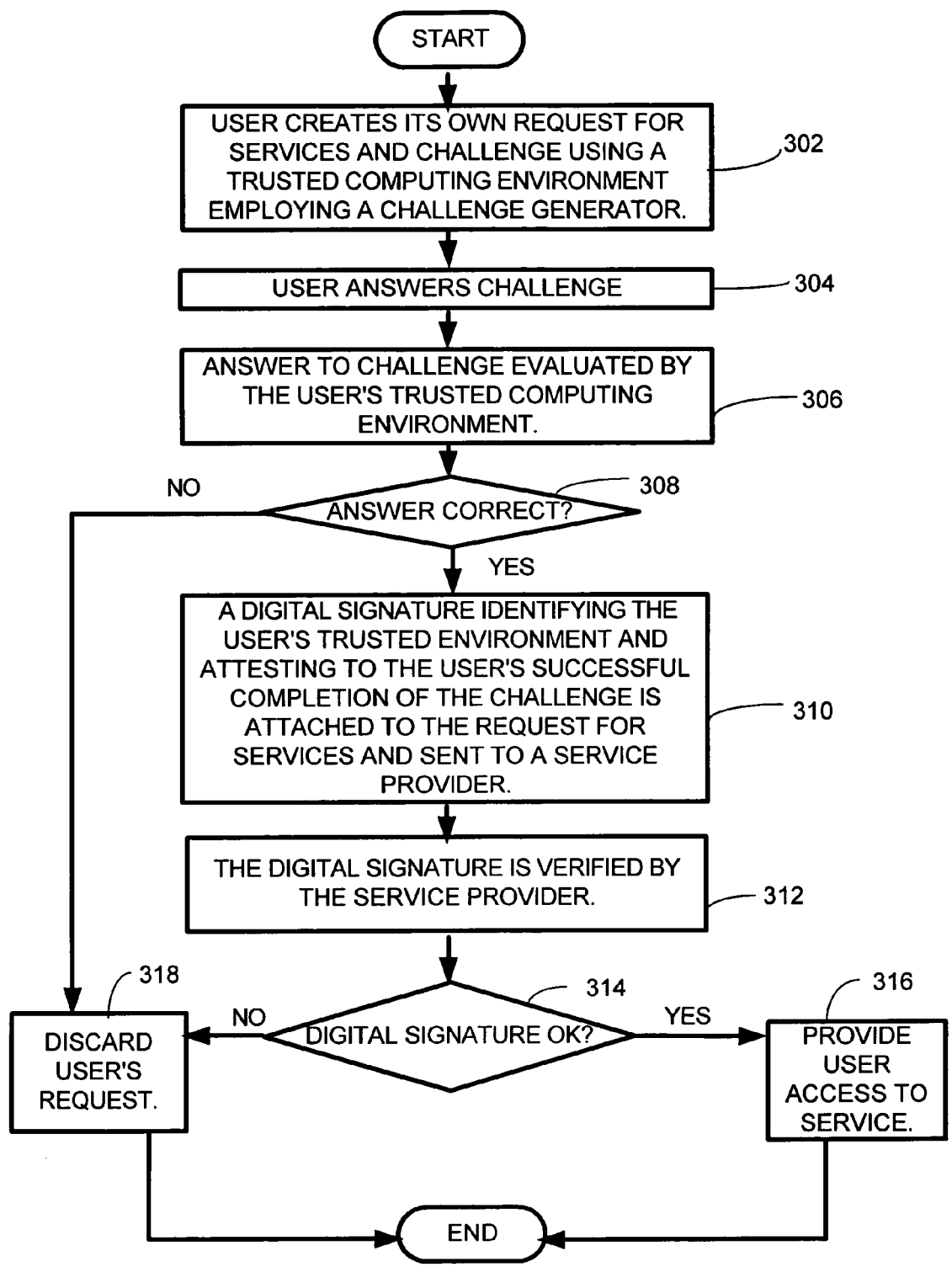
FIG. 3 is a simplified flow diagram for generating, answering and verifying a challenge according to one embodiment of the invention wherein the user's trusted computing environment or device verifies the user's answer to the challenge.

2.2 Embodiment wherein a Trusted Environment/Device Issues the Challenge and the User's Answer is Verified by the User's Trusted Environment The process actions of one embodiment of the invention are shown in FIG. 3. A user wishing to request a particular service from a service provider creates their own challenge using the user's computer trusted environment and information from the user's request for services (process action 302). The user then answers the challenge providing the answer to the user's trusted computing environment (process action 304). The user's trusted computing environment then evaluates the user's answer to the challenge, and if the answer is correct, generates a digital signature attesting to the successful completion of the challenge which is attached to the user's request for services and sent to the service provider (process actions 306, 308, 310); else the user's request is discarded (process action 318). The digital signature can also be used to authenticate the identity of the sender of the message, in this case the user's trusted device, and to ensure that the original content of the message or document that has been sent is unchanged. Typically this digital signature is message specific and hence is tied to a particular message. Once the service provider receives the user's message, the digital signature is verified by the service provider (process action 312). As mentioned above, various methods of encryption, decryption, and digital signature verification can be used. In verification of the user's message, in one embodiment of the invention, the service provider determines whether the signed statement matches the message, and whether the device that generated the digital signature is trustworthy. In this embodiment, in determining whether the signed statement matches the message the service provider's mail client checks to ensure that the signed statement matches the message being sent. To perform this action the service provider's mail client takes the message and other information about the message and performs a cryptographic hash against the digital signature via conventional methods. In determining whether the service provider trusts the user's trusted computing environment the service provider uses the digital signature. For example, in one embodiment, each trusted device or trusted computing environment has a certificate signed by a third party that verifies that the device is trusted by the third party. The trusted device or environment presents the certificate to the recipient's mail client which uses it to determine if it is a trustworthy device. If the digital signature is acceptable, the service provider processes the user's request for services and provides the user access to their services (process actions 314, 316). Otherwise the user's request is discarded (process action 318).

Figure 4:
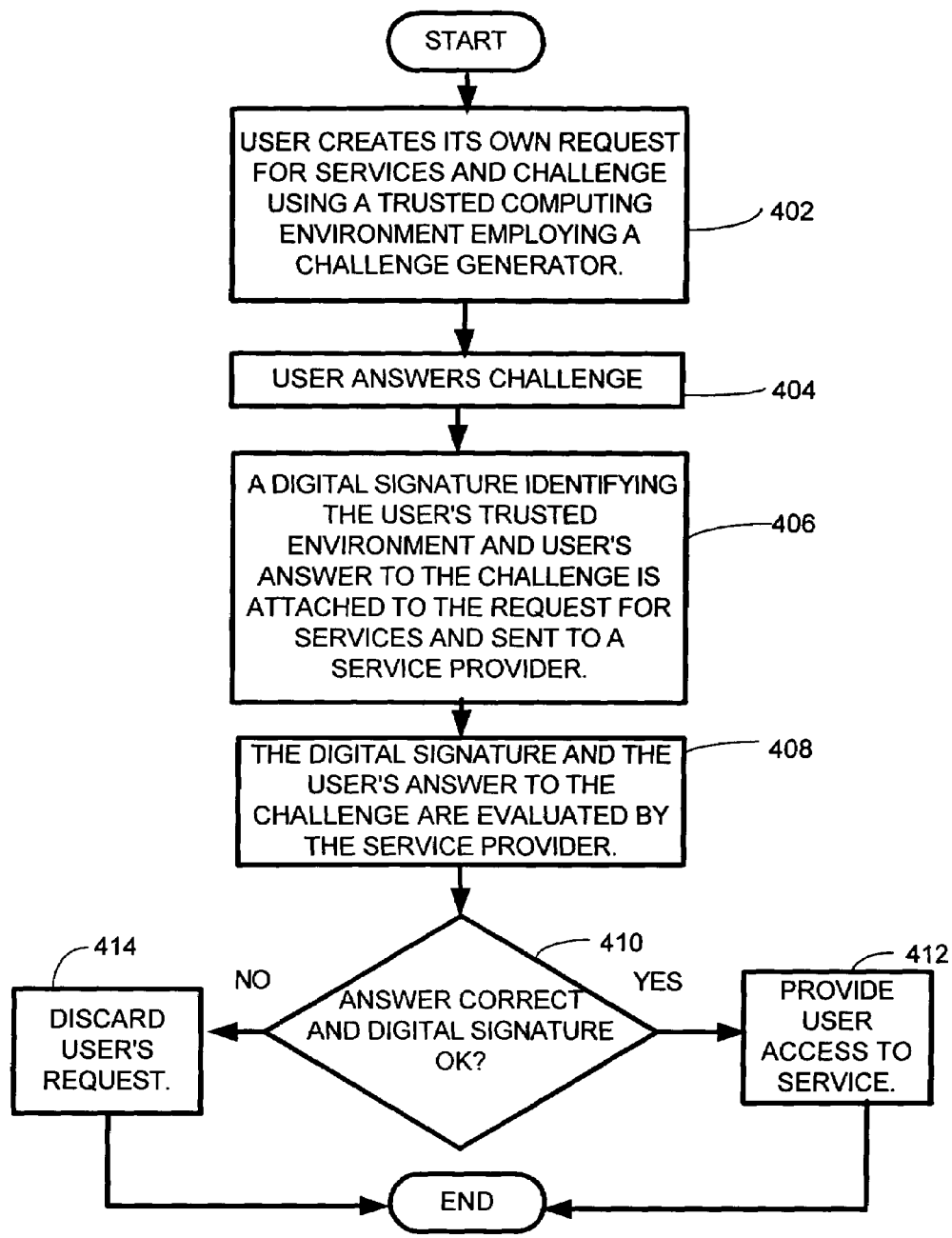
FIG. 4 is a simplified flow diagram for generating, answering and verifying a challenge according to one embodiment of the invention wherein the service provider verifies the user's answer to the challenge.
Figure 5:
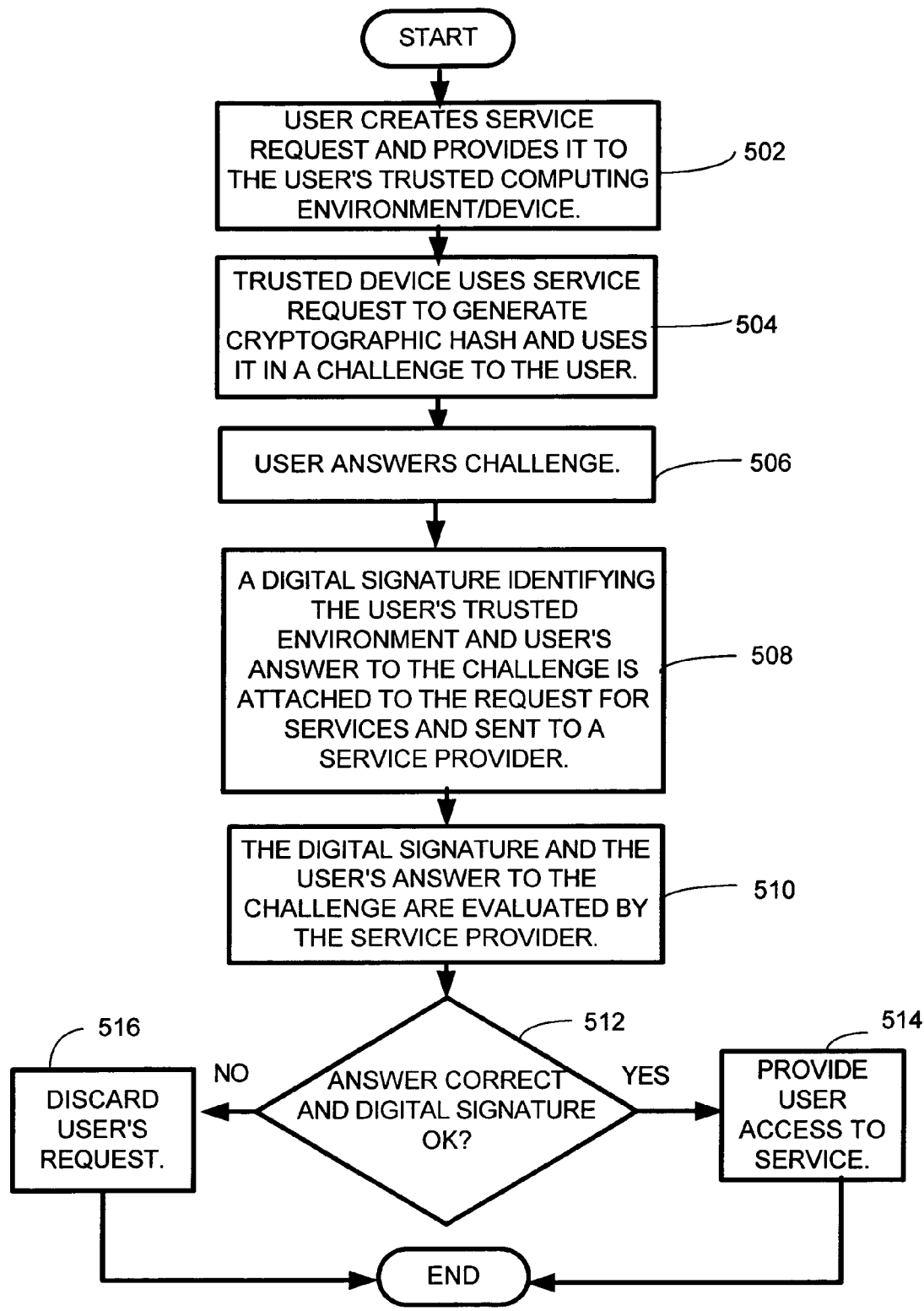
FIG. 5 is a simplified flow diagram which exemplifies one embodiment of the system and method according to the invention as related to an email application.

2.3. Embodiment wherein the Trusted Environment Issues the Challenge and the Challenge Answer is Evaluated by the Service Provider The process actions of another embodiment of the invention that is similar to that discussed and shown in FIG. 3, are shown in FIG. 4. In this embodiment the user's answer to the challenge is evaluated by the service provider instead of the user's trusted computing device. A user wishing to request a particular service creates its own challenge using its trusted environment and information from the service request message (process action 402). The user then answers the challenge (process action 404). The trusted computing environment then generates a digital signature that includes or is appended to the user's answer to the challenge as well as the correct answer to the challenge encrypted in a form that can be decrypted by the service provider and attaches this to the user's request for services that is sent to the service provider (process action 406). Once the service provider receives the user's message, the digital signature and the user's answer to the challenge can then be verified by the service provider (process action 408). If the digital signature and answer are acceptable, the service provider provides the user access to their services (process action 410, 412), otherwise the user's request for service is discarded (process action 414). It should be noted that variations of this embodiment as related to verification of the user's answer are possible. For instance, the signed message can include the user's answer and the correct answer. Alternately, the signed message can include only the correct answer and the service provide can verify the user's answer by comparing it to the correct answer. Alternately, the signed assertion can include no correct answer, and the trusted computing environment can verify the answer itself and assert that the challenge has been successfully completed. Additionally, instead of the trusted computing environment or device forwarding the response the service provider, the trusted computing environment or device could provide the signed message back to the user to forward to the service provider as part of a request for services.

A specific exemplary version of the invention discussed in the paragraph above is directed at an electronic mail service wherein the user's trusted computing environment issues the challenge and the challenge answer is sent to and evaluated by the service provider is as follows. A user creates a service request and sends it to its trusted computing environment (process action 502). The trusted computing environment computes a one-way cryptographic hash of the contents of a message which contains, for example, the date, the sender name/address, the recipient name/address, and the secret key, as shown in process action 504. In general, a cryptographic hash is a mathematical function that maps values from a large (or even very large) domain into a smaller range, and is (a) one-way in that it is computationally infeasible to find any input which maps to any pre-specified output; and (b) collision-free in that it is computationally infeasible to find any two distinct inputs which map to the same output. In the present invention, the result of the aforementioned hash is used to generate a short sequence of alphanumeric characters which is, for example, then rendered into a visual image (e.g., distorted text that may be easy for a human user to recognize, but that is difficult for an Optical Character Recognition program to recognize) that is presented to the user as a challenge. As shown in process action 506, the user then identifies the alphanumeric characters of the text string that is rendered into the visual image. The alphanumeric characters of the text string identified by the user which represent the user's answer to the challenge, as well as a digital signature, is included with a mail message requesting access to a service provider's service, as shown in process action 508. A service provider with access to the same secret key can check that the included text string identified by the user matches the hash of the message contents, date, etc., and reject the message if there is no match or the digital signature is unacceptable (process actions 510, 512, 514, 516). This relieves the sender from the burden of having to wait for a challenge from the recipient and relieves the recipient from having to send the challenges. Similar benefits can be obtained for other services besides email.

Figure 6:
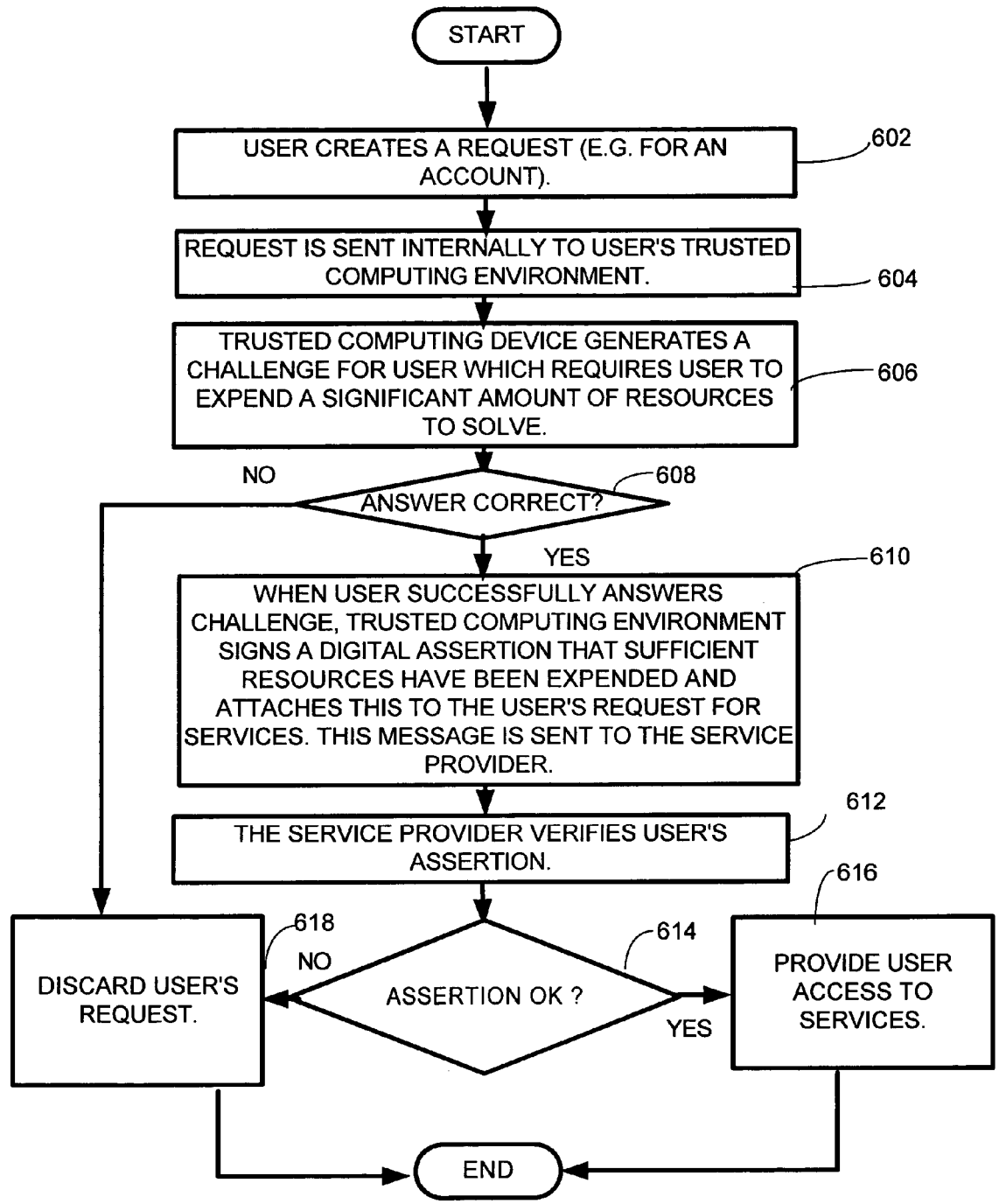
FIG. 6 is a simplified flow diagram for an embodiment of the invention which requires a user to expend a significant amount of resources to answer a challenge.

2.4 Embodiments wherein a User's Computing Device must Expend Significant Computational Resources to Answer the Challenge The system and method also can be implemented so that a user's computing device must expend a significant amount of resources to answer a challenge. For example, in one such embodiment, as shown in FIG. 6, the user creates a service request message and sends it to the user's trusted computing environment (process actions 602, 604). The user's trusted computing environment issues an arbitrary challenge to the user (process action 606) which requires that the user's computing device to expend a significant amount of resources to solve the answer to the challenge. Upon the user's successful completion of the challenge, the user's trusted computing environment digitally signs an assertion that a challenge has been successfully answered (process action 608, 610), else the user's request is discarded (process action 618). The signed assertion is typically generated for a particular message. The signed assertion is then attached to the message to allow the recipient (e.g., service provider) to verify that sufficient resources have been expended on this message and sent to the service provider (process action 612). If the assertion is satisfactory, the service provider allows access to their services (process actions 614, 616). Otherwise the service provider discards the service request message, as shown in process action 618.

An alternate embodiment of the present invention that also employs digitally signed assertions based on a user's expending sufficient resources to answer a challenge allows the trusted computing environment to digitally sign an assertion for any message that it is given but to report back to the user only a partial signature. The missing portion of the signature is then rendered as a challenge whose answer, when combined with the given portion of the signature, forms a complete signature. In this variant, it is also possible for the user to perform a computation search for the missing portion of the signature—thus obviating the need for user interaction by expending computational resources rather than human effort on the message. Another variation of this embodiment is, instead of just omitting portions of the signature, is to select and corrupt portions of the signature and have the user correct the corrupted signature and use the corrected corrupted portion of the signature as an answer. This variant allows the assertion and challenge to be generated separately.

2.5 Variations of the Embodiments Above wherein the Trusted Computing Environment or Device is Replaced with a Trusted Third Party The above-discussed embodiments can also be implemented by replacing the trusted computing device or environment with a trusted third party A trusted third party is a party that both the user and the service provider trust. In these embodiments, the trusted third party performs the functions of the user's trusted computing environment or device.

Figure 7:
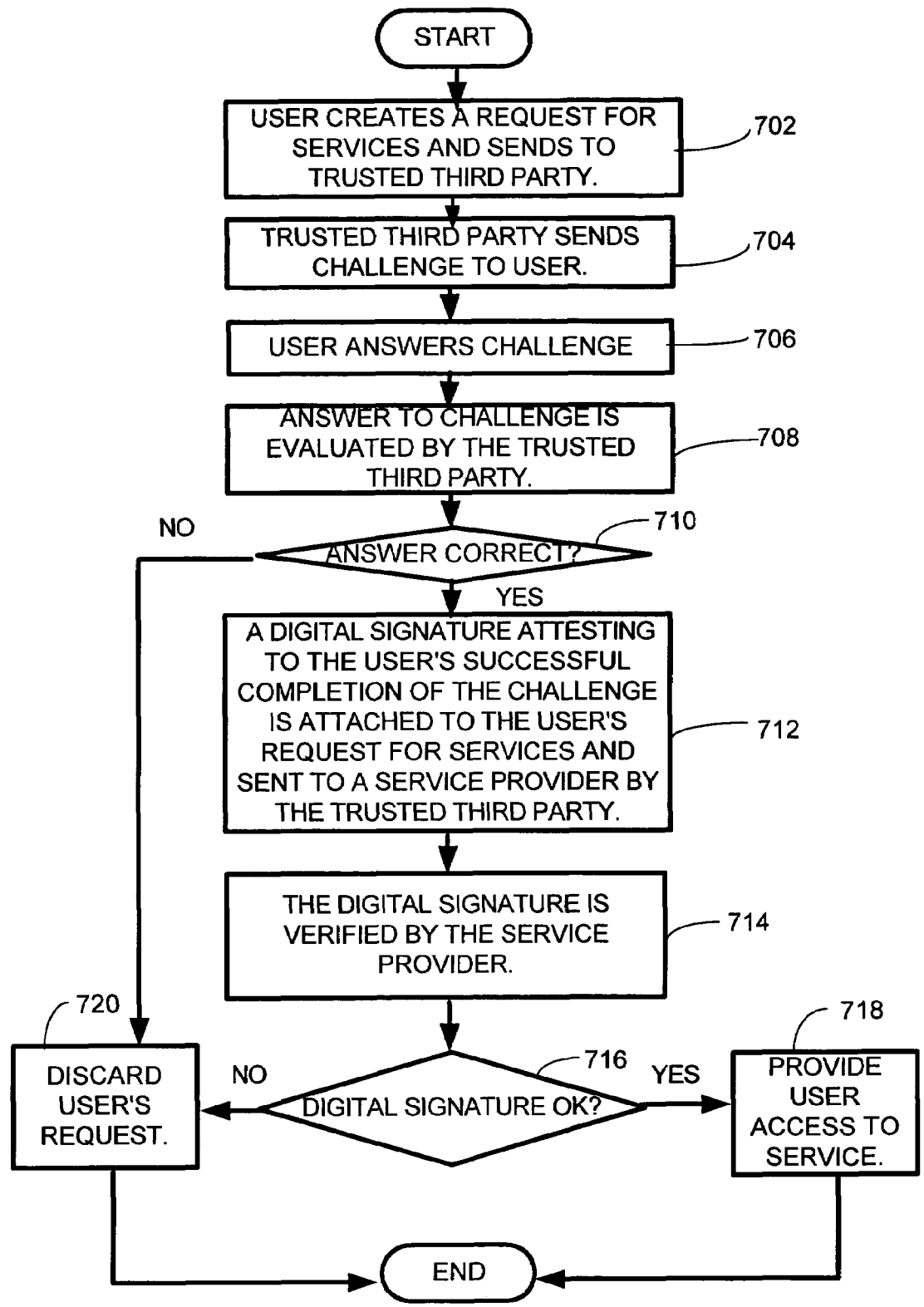
FIG. 7 is a simplified flow diagram wherein a trusted third party generates and verifies a challenge answered by the user.

For example, as related to the embodiment shown in FIG. 3, this embodiment can be implemented with a trusted third party as shown in FIG. 7. A user wishing to request a particular service from a service provider creates a service request and sends it to a trusted party (process action 702). The trusted third party sends the user a challenge (process action 704). The user then answers the challenge providing the answer to the trusted third party (process action 706). The trusted third party then evaluates the user's answer to the challenge and generates a digital signature attesting to the successful completion of the challenge which is attached to the user's request for services and sent to the service provider if the answer is correct (process actions 708, 710, 712)—otherwise the user's request for services is discarded (process action 720). It should be noted that, depending on the embodiment, the trusted third party or the user can forward the user's request and signed assertion to the service provider. Once the service provider receives the user's message, the digital signature is verified by the service provider (process action 714). As mentioned above, various methods of digital signature verification can be used (e.g., the signed message can include the user's answer and the correct answer; the signed message can include only the correct answer and the service provide can verify the user's answer by comparing it to the correct answer; or the signed assertion can include no correct answer, and the trusted third party can verify the answer itself and assert that the challenge has been successfully completed.)

If the digital signature or assertion is acceptable, the service provider processes the user's request for services and provides the user access to their services (process actions 716, 718). Otherwise the user's request is discarded (process action 720).

Figure 8:
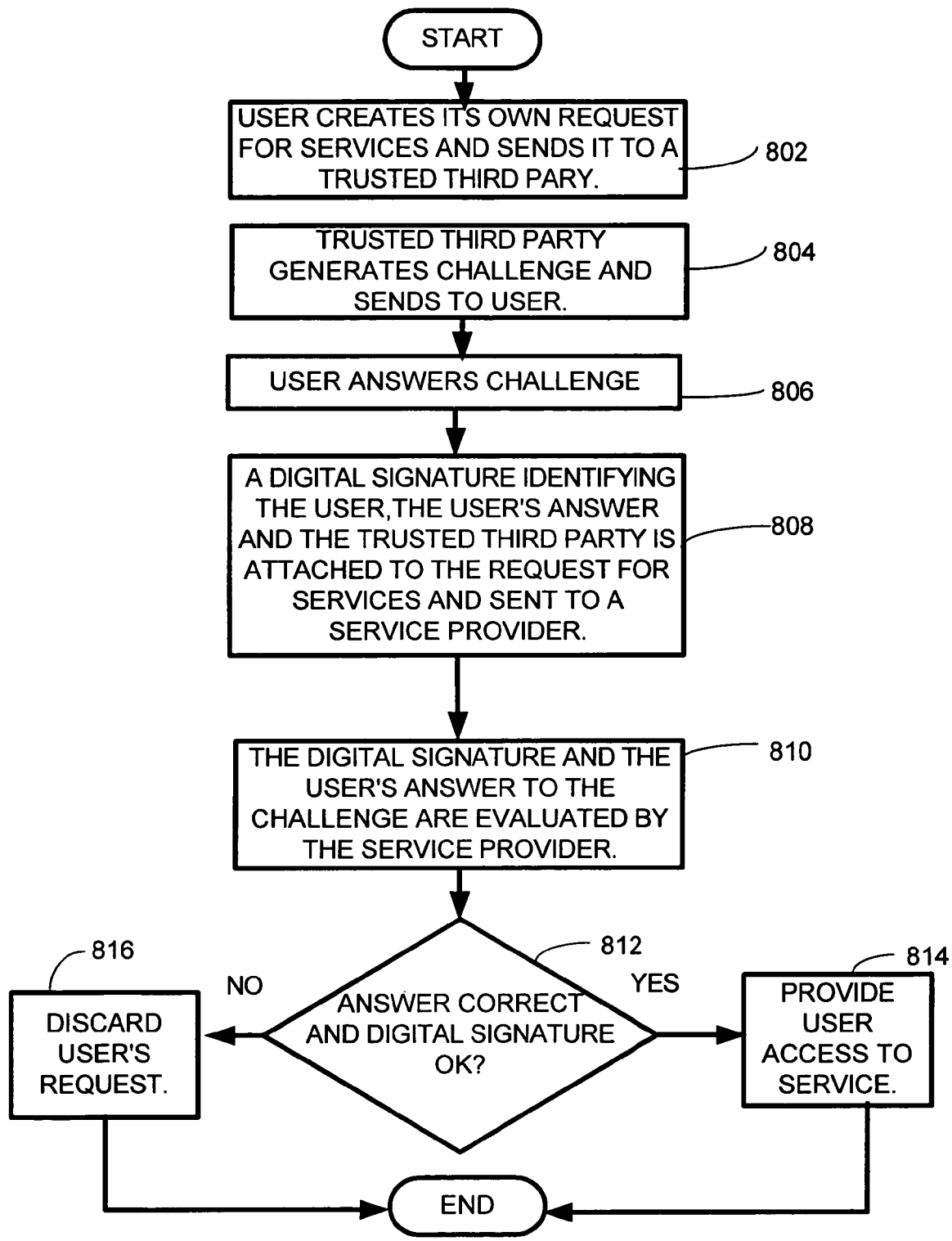
FIG. 8 is a simplified flow diagram wherein a trusted third party generates a challenge answered by the user and the challenge answer is verified by a service provider.

Likewise, the embodiment shown in FIG. 4 can also be implemented using a trusted third party instead of a trusted computing device or trusted computing environment. This embodiment is shown in FIG. 8. In this embodiment the trusted third party issues the challenge to the user and the user's answer to the challenge is evaluated by the service provider. More particularly, a user wishing to request a particular service creates a request message which is sent to a trusted third party (process action 802). The trusted third party sends the challenge to the user (process action 804). The user then answers the challenge (process action 806) and sends the answer to the trusted third party which then generates a digital signature that includes the user's answer to the challenge as well as the correct answer to the challenge encrypted in a form that can be decrypted by the service provider and attaches it to the user's request for services that is sent to the service provider (process action 808). Once the service provider receives the user's message, the digital signature and the user's answer to the challenge can then be verified by the service provider (process action 810). If the digital signature and answer are acceptable, the service provider provides the user access to their services (process action 812, 814), otherwise the user's request for service is discarded (process action 816).

The system and method of the invention employing a third party also can be implemented so that a user's computing device must expend a significant amount of resources to answer a challenge. For instance, in one such embodiment of the invention shown in FIG. 9 and similar to that shown in FIG. 6, the user creates a service request message and sends it to the trusted third party (process actions 902, 904). The trusted third party issues an arbitrary challenge to the user (process action 906) which requires that the user's computing device expend a significant amount of resources to solve the answer to the challenge. Upon the user's successful completion of the challenge, the answer is sent to the trusted third party (process action 908). If the answer is correct, the trusted third party digitally signs an assertion that a challenge has been successfully answered for a particular message (process action 910, 912). Otherwise the user's request is discarded (process action 920). The signed assertion is then attached to the message to allow the recipient (e.g., service provider) to verify that sufficient resources have been expended on this message (process action 912). If the assertion is satisfactory, the service provider allows access to their services (process actions 914, 916, 918). Otherwise the service provider discards the service request message, as shown in process action 920.

Figure 9:
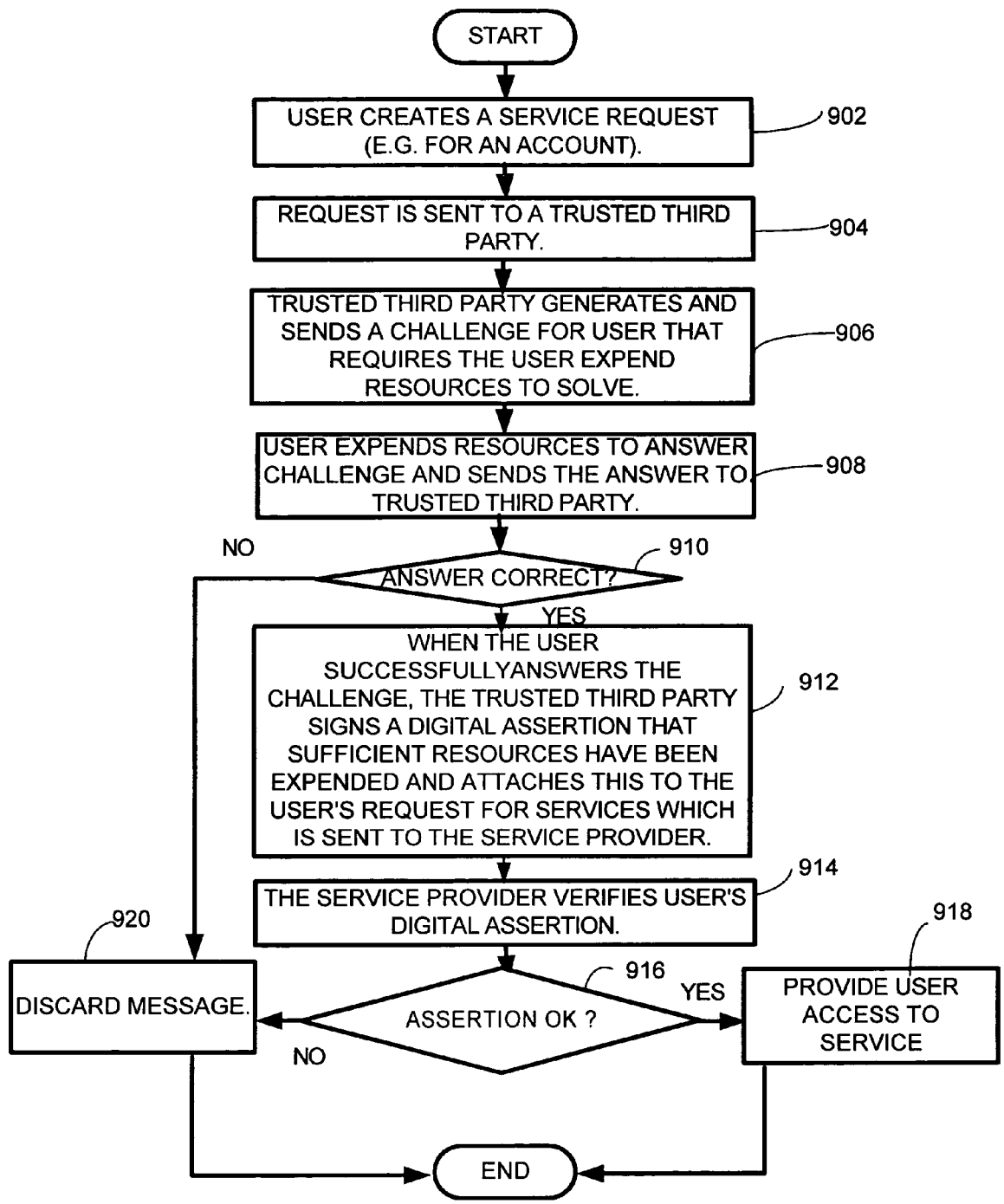
FIG. 9 is a simplified flow diagram wherein a trusted third party generates and verifies a challenge answered by the user who is required to expend significant resources to answer the challenge.

An exemplary embodiment of the invention shown and described with respect to FIG. 9, employs digitally signed assertions based on a user expending sufficient resources to answer a challenge allows a trusted third party to digitally sign an assertion for any message that it is given, but to report back to the user only a partial signature. The missing portion of the signature is then rendered as a challenge whose answer, when combined with the given portion of the signature, forms a complete signature. In this exemplary embodiment it is also possible for the user to perform a computation search for the missing portion of the signature—thus obviating the need for user interaction by expending computational resources rather than human effort on the message. Once the user provides the answer to the puzzle, the answer and the partial signature is submitted to the service provider who attempts to reconstruct the full digital signature by combining the pieces.

Wherefore, what is claimed is:

1. A computer-implemented process for determining whether a computer user is a human or a computer program, comprising the process actions of:

generating a request for services of a service provider at a user's computing device;

generating a challenge at a user's computing device comprising the actions of:

the user generating a preliminary request for services message to said service provider;

generating a cryptographic hash using data from said preliminary request for services message; and using said cryptographic hash to generate said challenge;

the user answering the challenge;

said user's computing device evaluating said user's answer to the challenge and attaching a digital signature thereto if said user's answer is correct;

sending said request for services including said digital signature from the user to a service provider;

said service provider evaluating said user's request for services and digital signature; and said service provider determining whether to allow said user access to said service provider's services based on said evaluation of said digital signature.

2. The computer-implemented process of claim 1 wherein the user's computing device comprises a trusted computing environment comprising a challenge generator and a secret key.

3. The computer-implemented process of claim 2 wherein the secret key is used to generate the digital signature.

4. The computer-implemented process of claim 1 wherein symmetric encryption techniques are used to encrypt at least one of said request for services and digital signature.

5. The computer-implemented process of claim 1 wherein asymmetric encryption techniques are used to encrypt at least one of said request for services and digital signature.

6. The computer-implemented process of claim 3 wherein said digital signature identifies and authenticates the user's trusted device and message data.

7. The computer-implemented process of claim 3 wherein the message data includes the user's answer to the challenge.

8. The computer-implemented process of claim 1 wherein the cryptographic hash is used to generate a short sequence of alphanumeric characters which is rendered into a visual image that the user is to identify.

9. The computer-implemented process of claim 1 wherein said service provider's determination of whether to allow said user access to said service provider's services is used for one of:
  assigning an email account;
  validating an input in a poll;
  using a search engine;
  using a chat room; and
  accessing data on a website.

10. A system for creating a non-interactive human proof, the system comprising:
  a general purpose computing device; and
  a computer program comprising program modules executable by the computing device, wherein the computing device is directed by the program modules of the computer program to,
  generate a challenge for a computer user using a user's computing device that includes a trusted computing device, wherein the challenge is generated by
    the user generating a preliminary request for services message to said service provider;
    generating a cryptographic hash using data from said preliminary request for services message; and
    using said cryptographic hash to generate said challenge;
  require a computer user to answer the challenge;
  send the computer user's answer to the challenge to a service provider with a request to access the computer user's services.

11. The system of claim 10 further comprising modules of a computer program to:
  verify the user's answer to the challenge; and
  if the user's answer is correct, allow the user access to services provided by the service provider.

12. The system of claim 10 wherein said trusted computing device comprises a challenge generator and a secret key.

13. The system of claim 10 wherein the cryptographic hash is used to generate a sequence of alphanumeric characters which is rendered into a visual image for the user to identify.

14. A computer-implemented process for determining whether to allow a computer user access to a service provider's services, comprising the process actions of:
  generating a challenge at a user's computing device for the user using a trusted computing device resident on the user's computing device comprising the actions of;
    the user generating a preliminary request for services message to said service provider:
    generating a cryptographic hash using data from said preliminary request for services message; and
    using said cryptographic hash to generate said challenge;
  the user answering the challenge;
  sending a request for services including a digitally signed assertion that the challenge has been successfully answered;
  said service provider evaluating said user's request for services and digitally signed assertion; and
  said service provider determining whether to allow said user access to said service provider's services based on said evaluation of said user's request for services and digitally signed assertion.

15. The computer-implemented process of claim 14 wherein the trusted computing device reports back to the user a partial digital signature, and wherein the remainder of the digital signature is rendered as a challenge.

16. The computer-implemented process of claim 15 wherein the user computes the remainder of the partial signature.

17. The computer-implemented process of claim 16 wherein the user's answer to the challenge when combined with the given portion of the digital signature forms the digitally signed assertion.

18. The computer-implemented process of claim 14 wherein said challenge is generated using information extracted from said user's request for services.

19. The computer-implemented process of claim 18 wherein the information extracted from said user's request for services includes one of:
  message content; date; time; a sender's name; the sender's address; the recipient's name; the recipient's address; and an answer to a challenge generated by the challenge generator.

20. A computer-implemented process for determining whether to allow a computer user access to a service provider's services, comprising the process actions of:
  generating a challenge for a user at the user's computing device using a trusted computing device resident on the user's computing device by generating a cryptographic hash of information that is extracted from a message the user generates requesting services from a service provider, wherein the cryptographic hash is rendered into a string of alphanumeric characters that are presented as a visual image as said challenge to the user;
  the user answering the challenge;
  the user receiving a digitally signed assertion;
  the user sending a request for services including a digitally signed assertion that the challenge has been successfully answered;
  said service provider evaluating said user's request for services and digitally signed assertion; and
  said service provider determining whether to allow said user access to said service provider's services based on said evaluation of said user's request for services and digitally signed assertion.

21. The computer-implemented process of claim 20 wherein said alphanumeric characters that are presented as a visual image are not recognizable by an optical character recognition program.

22. A computer-implemented process for determining whether to allow a computer user access to a service provider's services, comprising the process actions of:
- a user generating a preliminary request for services message to a trusted computing device resident at a trusted third party:
- generating a challenge for the user that comprises a partial digital signature using the trusted computing device resident at the trusted third party by;
  - generating a cryptographic hash using data from said preliminary request for services message; and
  - using said cryptographic hash to generate said challenge;
- the user answering the challenge to complete the digital signature;
- the user sending a request for services including the complete digital signature to a service provider;
- said service provider evaluating said user's request for services and digital signature; and
- said service provider determining whether to allow said user access to said service provider's services based on said evaluation of said user's request for services and digital signature.

23. The computer-implemented process of claim 22 wherein the user's computing device computes the portion of the digital signature necessary to complete the partial digital signature.

24. A computer-implemented process for determining whether a computer user is a human or a computer program, comprising the process actions of:
- generating a request for services of a service provider at a user;
- generating a challenge at a trusted third party and providing it to said user comprising the actions of:
  - generating a cryptographic hash using data from the request for services; and
  - using said cryptographic hash to generate said challenge;
- the user answering the challenge;
- said trusted third party evaluating said user's answer to the challenge and attaching a digital signature thereto if said user's answer is correct;
- sending said request for services including said digital signature from the trusted third party to a service provider;
- said service provider evaluating said user's request for services and digital signature; and
- said service provider determining whether to allow said user access to said service provider's services based on said evaluation of said digital signature.

25. A computer-implemented process for determining whether to allow a computer user access to a service provider's services, comprising the process actions of:
- a user generating a request for services of a service provider and sending said request to a third party;
- said third party generating a challenge for the user comprising the actions of
  - generating a cryptographic hash using data from the request for services; and
  - using said cryptographic hash to generate said challenge;
- the user answering the challenge and sending said answer to said third party;
- sending the user's request for services including a digital signature identifying the third party and the user's answer to the service provider;
- said service provider evaluating said user's answer and digital signature; and
- said service provider determining whether to allow said user access to said service provider's services based on said evaluation of said user's answer and digital signature.

26. A computer-implemented process for determining whether to allow a computer user access to a service provider's services, comprising the process actions of:
- a user generating a request for services of a service provider and sending said request to a trusted third party;
- said third party generating a challenge comprising the actions of:
  - generating a cryptographic hash using data from the request for services; and
  - using said cryptographic hash to generate said challenge;
- said third party providing the challenge to the user;
- the user answering the challenge and providing the answer to said trusted third party;
- sending the request for services including a digitally signed assertion that the challenge has been successfully answered to a service provider;
- evaluating said request for services and digitally signed assertion; and
- said service provider determining whether to allow said user access to said service provider's services based on said evaluation of said digitally signed assertion.

27. The computer-implemented process of claim 26 wherein the trusted third party reports back to the user a partial digital signature, and wherein the remainder of the digital signature is rendered as a challenge.

28. The computer-implemented process of claim 27 wherein the user computes the remainder of the partial signature as the answer to the challenge.

29. The computer-implemented process of claim 27 wherein the user's answer to the challenge when combined with the given portion of the digital signature forms the digitally signed assertion.

30. The computer-implemented process of claim 26 wherein said challenge is generated using information extracted from said user's request for services.

31. The computer-implemented process of claim 26 wherein the trusted third party reports back to the user a corrupted digital signature whose correction is rendered as a challenge.

32. A computer-readable medium having computer-executable instructions for determining whether a computer user is human or a computer program, comprising program modules for:
- generating a request for services of a service provider at a user's computing device;
- generating a challenge at a user's computing device, comprising the actions of:
  - the user generating a preliminary request for services message to said service provider;
  - generating a cryptographic hash using data from said preliminary request for services message; and
  - using said cryptographic hash to generate said challenge;
- the user answering the challenge;

said user's computing device evaluating said user's answer to the challenge and attaching a keyed hash thereto if said user's answer is correct;

sending said request for services including said keyed hash from the user to a service provider;

said service provider evaluating said user's request for services and keyed hash; and said service provider determining whether to allow said user access to said service provider's services based on said evaluation of said keyed hash.

33. The computer-readable medium of claim 32 wherein the user's computing device comprises a trusted computing environment comprising a challenge generator and a secret key.

34. The computer-readable medium of claim 32 wherein said keyed hash identifies and authenticates the user's trusted device and message data.

35. The computer-readable medium of claim 32 wherein the message data includes the user's answer to the challenge.

36. The computer-readable medium of claim 32 wherein the cryptographic hash is used to generate a short sequence of alphanumeric characters which is rendered into a visual image that the user is to identify.

37. The computer-readable medium of claim 32 wherein said service provider's determination of whether to allow said user access to said service provider's services is used for one of:

assigning an email account;
validating an input in a poll;
using a search engine;
using a chat room; and
accessing data on a website.

* * * * *

UNITED STATES PATENT AND TRADEMARK OFFICE
CERTIFICATE OF CORRECTION

PATENT NO. : 7,337,324 B2  
APPLICATION NO. : 10/725243  
DATED : February 26, 2008  
INVENTOR(S) : Josh Benaloh et al.

Page 1 of 1

It is certified that error appears in the above-identified patent and that said Letters Patent is hereby corrected as shown below:

In column 16, line 6, in Claim 14, delete "of;" and insert -- of: --, therefor.

In column 17, line 10, in Claim 22, delete "party:" and insert -- party; --, therefor.

In column 17, line 13, in Claim 22, delete "by;" and insert -- by: --, therefor.

In column 17, line 38, in Claim 24, delete "of:" and insert -- of; --, therefor.

In column 17, line 61, in Claim 25, after "of" insert -- : --.

Signed and Sealed this  
Fifteenth Day of February, 2011

David J. Kappos  
*Director of the United States Patent and Trademark Office*